United States Patent [19]

Volk

[11] 4,424,798
[45] Jan. 10, 1984

[54] SELF-HEATABLE CONTAINER

[76] Inventor: Hans-Dieter Volk, 1600 S. Bayshore La., Miami, Fla. 33133

[21] Appl. No.: 383,122

[22] Filed: May 28, 1982

[51] Int. Cl.³ ............................................. A47G 23/04
[52] U.S. Cl. .................................... 126/262; 126/261
[58] Field of Search ............... 126/262, 25 B, 26, 261, 126/38, 43, 263, 246, 269, 50; 44/38, 39, 40, 41; 99/339

[56] References Cited

U.S. PATENT DOCUMENTS

| 824,938 | 7/1906 | Lang . | |
|---|---|---|---|
| 1,173,454 | 2/1916 | Nakamizo . | |
| 1,325,515 | 12/1919 | Hartmann | 126/262 |
| 1,437,073 | 11/1922 | Popper | 126/43 |
| 1,452,239 | 4/1923 | Gutlin | 126/43 X |
| 1,953,982 | 4/1934 | Wygodsky . | |
| 2,036,611 | 4/1936 | Simmons . | |
| 2,101,180 | 12/1937 | Jacobs | 126/261 |
| 2,174,824 | 10/1939 | Frank | 126/43 X |
| 2,606,547 | 8/1952 | Stofel . | |
| 2,643,650 | 6/1953 | Miron . | |
| 2,722,214 | 11/1955 | Borde | 126/43 X |
| 2,733,709 | 2/1956 | Sukacev . | |
| 2,801,627 | 8/1957 | Burke et al. | 126/262 |
| 3,120,226 | 2/1964 | Akin . | |
| 3,145,706 | 8/1964 | Saunders . | |
| 3,262,445 | 7/1966 | Stults et al. . | |
| 3,369,538 | 2/1968 | Frey et al. . | |
| 3,430,623 | 3/1969 | Hoch . | |
| 3,502,068 | 3/1970 | Henson . | |
| 3,552,379 | 1/1971 | Clarke . | |
| 3,566,857 | 3/1971 | Price . | |

FOREIGN PATENT DOCUMENTS

| 580829 | 4/1924 | France | 126/43 |
| 505894 | 12/1954 | Italy | 126/246 |
| 195922 | 5/1938 | Switzerland | 126/262 |

OTHER PUBLICATIONS

Trademark, Sterno Canned Heat Cooking Fuel, Sterno, Inc. Distr. N.Y., N.Y. 10022 Colgate-Palmolive Co., N.Y.F.D.C. of A No. 3414.

Primary Examiner—Samuel Scott
Assistant Examiner—Randall L. Green
Attorney, Agent, or Firm—Spencer & Frank

[57] ABSTRACT

A self-heatable container including a container member having a bottom provided with a downwardly extending heat transfer projection, which projection itself has a downwardly opening recess. A cup-shaped member having an upwardly extending wall connected to the bottom of the container member has a base provided with an upwardly extending projection. The cup-shaped member also has holes to allow entry and exit of air. A fuel pellet is positioned in the recess and held therein by the upwardly extending projection of the cup-shaped member.

10 Claims, 3 Drawing Figures

SELF-HEATABLE CONTAINER

BACKGROUND OF THE INVENTION

The invention relates to a disposable container which incorporates a fuel source for heating a substance prepacked therein.

Such a container is useful for a large range of packaged products that require heating proir to use, such as various types of solid foods, beverages or chemical products. The use of such a self-heatable container is particularly expedient in remote locations or situations where electricity or other common energy sources are not readily available for purposes of heating, or when the necessary cooking utensils such as pots and pans are not accessible. Thus, campers, hikers, those working at construction sites or those that find themselves in emergency situations would find self-heatable food containers of great use.

SUMMARY OF THE INVENTION

It is an object of the invention to provide a one unit container enclosing a pre-packed product that requires heating prior to use wherein the container incorporates a fuel source to effect such heating.

It is another object of the invention to provide a self-heatable container which is safe and easy to use.

It is a further object of the invention to provide a self-heatable container which contains a solid fuel which can be ignited by a match and which can be stored for long periods of time without damage due to moisture or other weather conditions.

These and other objects are accomplished in accordance with the invention in which a self-heatable container includes a container member having a bottom provided with a downwardly extending, heat-transfer projection which is further provided with a downwardly opening recess. A cup-shaped member having an upwardly extending wall is connected to the bottom of the container member. The cup-shaped member has a base provided with an upwardly extending projection and the cup-shaped member also has ventilation holes to allow entry and exit of air. A fuel pellet is positioned in the recess of the downwardly exteding projection and is held therein by the upwardly extending projection of the cup-shaped member.

The ventilation holes in the cup-shaped member are preferably positioned and sized to create a chimney effect during combustion of the fuel pellet to facilitate heating of the container member. To accomplish this, air entry holes are provided at the bottom of the wall of the cup-shaped member and exit holes for air and combustion products are provided at the top of the wall of the cup-shaped member, with the entry holes being smaller than the exit holes. With this arrangement, when the fuel pellet is lit, air is drawn in through the entry holes and, by convection, exits with the combustion products through the exit holes.

The container and cup-shaped members of the self-heatable container in accordance with the invention are preferably manufactured as separate parts and subsequently assembled. For this purpose the top of the wall of the cup-shaped member is provided with an outwardly flanged edge and an upwardly protruding ring is provided on the wall of the container member. The self-heatable container is then assembled by press fitting the container member into the cup-shaped member until the flanged edge abuts the protruding ring. A uniform space is thus provided between the upward projection of the cup-shaped member and downward projection of the container member, in which space the fuel pellet is disposed.

In another aspect of the invention the pellet is positioned on an upper surface of the upwardly extending projection so that part of the undersurface of the pellet is exposed. The exposed undersurface is provided to facilitate the lighting of the pellet by a matchstick.

Additional objects and features of the present invention will be set forth in part in the description which follows and in part will be obvious from the description or can be learned by practice of the invention. It is to be understood that both the foregoing general description and the following detailed description are exemplary, and are not intended to be restrictive of the scope of the invention.

DETAILED DESCRIPTION OF THE PREFERRED EMBODIMENT

Figure 1:
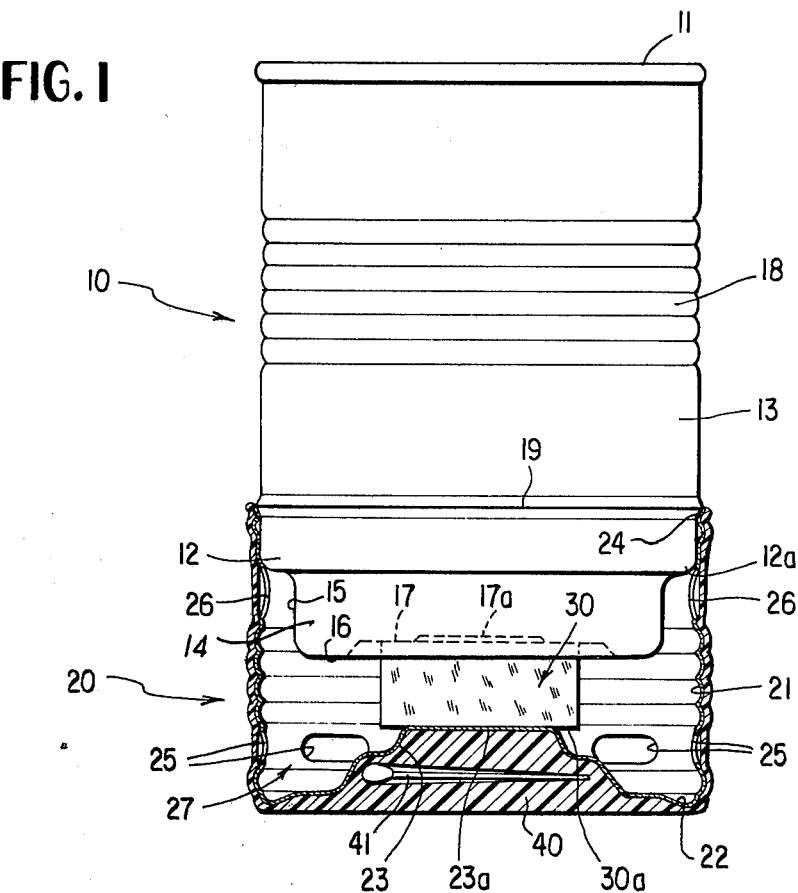
FIG. 1 shows a partial elevation and a partial cross section of an embodiment according to the present invention.

Referring to FIG. 1 a self-heatable container is shown comprising a container member 10, a cup-shaped member 20 and a fuel pellet 30 housed in cup-shaped member 20. Container member 10 has a top 11 and a bottom 12 which are connected by a side wall 13. Container member 10 is prepacked with a food or chemical product which requires heating prior to use. The product is presealed within container member 10 by attaching top 11 in a manner well known in the art.

Bottom 12 is provided with a downwardly extending, heat transfer projection 14 which has an outer surface 15 and a lower surface 16 within which a recess 17 is provided. Recess 17 may include a further smaller diameter recess 17a to improve the heat transfer characteristics of the container.

A series of beads or corrugations 18 are provided on side wall 13 to strengthen container member 10 and to afford resistance against implosion. Container member 10 is further provided with an outwardly protruding ring 19 disposed on side wall 13 just above bottom 12. Bottom 12 has a rounded corner 12a at its junction with side wall 13. Rounded corner 12a and ring 19 are significant in connection with the assembly of container member 10 with cup-shaped member 20 as will be described hereinafter.

Cup-shaped member 20 has an upwardly extending wall 21 which may be corrugated in a manner similar to side wall 13 to provide strength as well as to add radial resiliency for purposes of receiving and retaining container member 10. Wall 21 is joined to a base 22 which is provided with an upwardly extending projection or cone 23 which has an upper surface 23a for supporting fuel pellet 30. Wall 21 has an outwardly pointing flange 24 at its upper end which in combination with rounded corner 12a of container member 10 serves to guide container member 10 into cup-shaped member 20 during assembly. Container member 10 is thus press fitted into cup-shaped member 20 until ring 19 abuts flange 24 and is retained in cup-shaped member 20 by the radial force exerted by the upper region of wall 21 on the area of contact with side wall 13 at and below ring 19.

Cup-shaped member 20 is further provided with lower ventilation holes 25 and upper ventilation holes 26, holes 26 being preferably larger than holes 25. Holes 25 are preferably provided below fuel pellet 30 and holes 26 are preferably provided at the level of downwardly extending projection 14. The positioning and sizing of holes 25 and 26 creates a chimney effect during the burning of fuel pellet 30. Thus, air used for combustion enters through lower openings 25 and the combustion products and air exit through upper openings 26.

As can be seen from FIG. 1 fuel pellet 30 protrudes laterally beyond its supporting surface 23a. The purpose of this is to provide an exposed undersurface 30a of fuel pellet 30 for ignition by a lighted match which is inserted through one of the lower openings 25.

Fuel pellet 30 may comprise one of a variety of available solid fuels such as methenamine tablets or pellets comprising a mixture of methenamine and hexamine. Fuel pellet 30 may be glued to surface 23a to prevent slippage during assembly of cup-shaped member 20 with container member 10.

Recess 17 has a diameter greater than the lateral dimension of fuel pellet 30. Preferably the thickness of fuel pellet 30 is such that, upon assembly of container member 10 with cup-shaped member 20, it is clamped into recess 17 by upper surface 23a.

Wall 21 and upwardly extending projection 23 form a trough 27 which serves as a reservoir for the accumulation of moisture resulting, for example, from condensation. The positioning of lower holes 25 below fuel pellet 30 provides a drain for trough 27 to prevent such moisture from coming into contact with fuel pellet 30.

A moisture proof protective cover 40, such as styrofoam, or any other suitable material may be provided on the outer surface of cup-shaped member 20 in a manner to cover openings 25 and 26 to protect fuel pellet 30 against humidity and water during storage of the self-heatable container. In addition, a matchstick 41 may be molded by the same material as protective cover 40 into the base of cup-shaped member 20 in the space under upwardly extending projection 23. Matchstick 41 is preferably of the type that can be ignited by scratching the tip of the match head against any rough surface.

Figure 2:
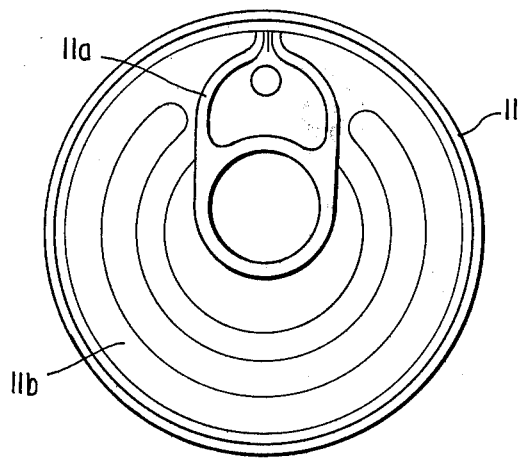
FIG. 2 shows a pull tab top that may be used with the embodiment depicted in FIG. 1.

As shown in FIG. 2, top 11 may be provided with a pull tab 11a which when pulled will remove a disk 11b from top 11 in a manner well known in the art.

In order to operate the above described self-heatable container, protective cover 40 is removed by tearing it away and matchstick 41 is re-covered. Container member 10 is then opened at top 11 by removing disk 11b via pull tab 11a. The contents of container member 10 may then be stirred, is desired, and then matchstick 41 lit, inserted into one of the lower openings 25 and placed adjacent the partially exposed undersurface 30a to ignite fuel pellet 30. Fuel pellet 30 is manufactured to be of sufficient energy capacity to bring the contents of container member 10 to the desired temperature.

If desired, fuel pellet 30 may be lit while the closed container is horizontal, after which the container is placed vertical. The container is then open and the contents are stirred. The pull tap 11b will blow in case it is not removed manually on time, thus avoiding explosion of the can due to over heating of the contents.

Figure 3:
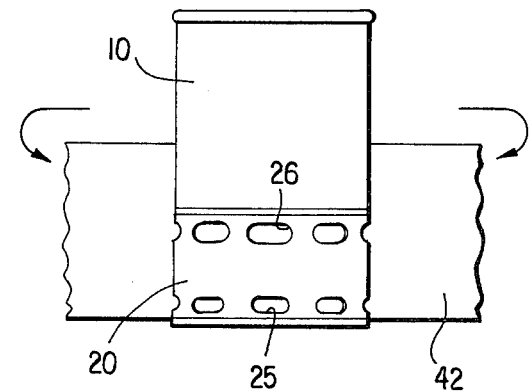
FIG. 3 is an elevational view showing a removable label that may be used with the embodiment illustrated in FIG. 1.

As shown in FIG. 3, a removable label 42 may be provided on container member 10 which could be removed and used, if desired, to douse the burning fuel pellet 30, by wrapping it around cup-shaped member 20 to close off ventilation through openings 25 and 26. Removable label 42 is preferably secured to container member 10 during manufacture with one or more glue spots along one edge in a manner which permits it to be easily removed in one piece for the above described purpose.

It will be understood that various changes in the details, materials and steps which have been described herein to explain the nature of the invention may be made by those skilled in the art within the principle and scope of the invention as expressed in the appended claims.

What is claimed is:

1. A self-heatable container comprising:
   (a) a container member having a bottom provided with a downwardly extending heat-transfer projection, said projection having a downwardly opening recess;
   (b) a cup-shaped member having an upwardly extending wall connected to the bottom of said container member, said cup-shaped member having a base provided with an upwardly extending projection, said cup-shaped member further having holes to allow entry and exit of air; and
   (c) a fuel pellet positioned in said recess and held therein by the upwardly extending projection of said cup-shaped member.

2. A self-heatable container according to claim 1 wherein said holes include at least one entry hole at the bottom of the wall of said cup-shaped member below said fuel pellet and at least one exit hole at the top of the wall of said cup-shaped member at the level of said downwardly extending projection, said at least one entry hole being smaller than said at least one exit hole, whereby when said pellet is lit, air is drawn in through the at least one entry hole and exits through said at least one exit hole to create a chimney effect.

3. A self-heatable container according to claim 1 wherein said upwardly extending projection has an upper surface on which said pellet is positioned, and said pellet has a partially exposed undersurface when so positioned on said upper surface.

4. A self-heatable container according to claim 1 wherein said container member has a cylindrical wall joined to said bottom, said cylindrical wall has an outwardly protruding ring adjacent said bottom, the top of said upwardly extending wall of said cup-shaped member has an outwardly pointing flange, the bottom of said container member is positioned in said cup-shaped member so that said ring abuts said flange, and said container member is retained in said cup-shaped member by a radial force presented by said upwardly extending wall of said cup-shaped member against said cylindrical wall of said container member.

5. A self-heatable container according to claim 1 wherein said container member has a top and a cylindrical wall connecting said top and bottom, and said top is provided with a pull-tab opener.

6. A self-heatable container according to claim 5 wherein said cylindrical wall of said container member is provided with a series of beaded rings to increase resistance of said cylindrical wall against implosion.

7. A self-heatable container according to claim 1 further comprising a label wrapped around said container member, said label being constructed so that it can be removed in substantially one piece from said container member and replaced around said cup-shaped member to close off said holes.

8. A self-heatable container according to claim 1 wherein the base of said cup-shaped member forms a trough between said upwardly extending wall and said upwardly extending projection for the accumulation of moisture and at least one of said holes is provided below said fuel pellet to drain off water collected in said trough to prevent said fuel pellet from getting wet.

9. A self-heatable container according to claim 1 wherein said cup-shaped member is provided with a moisture proof protective coating which at least covers said holes.

10. A self-heatable container according to claim 1 wherein said upwardly extending projection in said cup-shaped member forms a space under said cup-shaped member, and further comprising at least one matchstick and moisture proof material molding said at least one matchstick into said space.

* * * * *